(12) United States Patent
Richard

(10) Patent No.: US 6,274,183 B1
(45) Date of Patent: Aug. 14, 2001

(54) RICE COMPOSITION FOR COATING FOODS

(76) Inventor: Travis Richard, P.O. Box 206, Gueydan, LA (US) 70542

(*) Notice: Subject to any disclaimer, the term of this patent is extended or adjusted under 35 U.S.C. 154(b) by 0 days.

(21) Appl. No.: 09/591,978

(22) Filed: Jun. 12, 2000

(51) Int. Cl.⁷ .................. A23L 1/31; A23L 1/36
(52) U.S. Cl. .................. 426/296; 426/92; 426/93; 426/96; 426/618; 426/652
(58) Field of Search ............... 426/89, 93, 96, 426/289, 293, 297, 615, 618, 629, 652, 296, 92

(56) References Cited

U.S. PATENT DOCUMENTS

| | | | |
|---|---|---|---|
| 3,751,268 | * | 8/1973 | Van Putten et al. .................. 99/100 |
| 3,952,110 | * | 4/1976 | Knight et al. .................. 426/296 |
| 4,068,009 | * | 1/1978 | Rispoli et al. .................. 426/291 |
| 4,260,637 | * | 4/1981 | Rispoli et al. .................. 426/96 |
| 4,367,242 | * | 1/1983 | Jarvis et al. .................. 426/293 |
| 4,963,378 | * | 10/1990 | Bhardwaj .................. 426/302 |
| 5,019,406 | * | 5/1991 | Ang et al. .................. 426/302 |
| 5,527,549 | * | 6/1996 | Bernacchi et al. .................. 426/89 |
| 5,571,546 | * | 11/1996 | Kristinus et al. .................. 426/93 |
| 5,731,019 | * | 3/1998 | Schafer et al. .................. 426/99 |

FOREIGN PATENT DOCUMENTS 8-228662 * 9/1996 (JP).

* cited by examiner

*Primary Examiner*—Arthur L. Corbin
(74) *Attorney, Agent, or Firm*—Greg R. Mier; Joe L. Lemoine, Jr.; Jesse D. Lambert

(57) ABSTRACT

A food coating composition which is manufactured from so-called fragrant or scented rices, which are also known as "aromatic rices," and which derive their distinct aroma and flavor primarily from a potent aroma component, 2-acetyl-1-pyrroline. The food coating composition is manufactured by grinding a fragrant rice having a 2-acetyl-1-pyrroline concentration of at least 40 ppb by weight to a predetermined particle size at a predetermined temperature. The resulting food coating composition provides excellent and uniform adherence to the food product, as well as improved crispness. Moreover, the resulting food coating composition provides a unique and distinct aroma and taste which is derived from the 2-acetyl-1-pyrroline.

6 Claims, No Drawings

RICE COMPOSITION FOR COATING FOODS

BACKGROUND

Field of the Invention

The present invention relates generally to edible food coatings and methods of making such food coatings. More particularly, the present invention relates to a food coating made from aromatic rice.

Description of Related Art

Breading, dusting, flouring and otherwise coating foods prior to cooking is popular among U.S. consumers because of the flavorful taste, crisp texture, and typically golden brown appearance resulting therefrom. In recent years, dry mixes and convenience-oriented products have become available for easier, less time-consuming preparation of coated foods which are cooked by roasting, baking, broiling, frying and the like.

Various types of coated foods and the processes by which they are prepared appear in U.S. Pat. No. 3,751,268, dated Aug. 7, 1973, to Van Patten et al.; U.S. Pat. No. 3,952,110, dated Apr. 20, 1976, to Knight et al.; U.S. Pat. Nos. 4,068,009 and 4,260,637, dated Jan. 10, 1978 and Apr. 7, 1981, respectively, to Rispoli et al.; U.S. Pat. No. 4,367,242, dated Jan. 4, 1983, to Jarvis et al.; U.S. Pat. No. 4,963,378, dated Oct. 16, 1990, to Bhardwaj, U.S. Pat. No. 5,019,406, dated May 28, 1991, to Ang et al.; U.S. Pat. No. 5,527,549, dated Jun. 18, 1996, to Bernacchi et al.; U.S. Pat. No. 5,571,546, dated Nov. 5, 1996, to Kristinus et al.; and U.S. Pat. No. 5,731,019, dated Mar. 24, 1998, to Schafer et al.

The intent of many of the coating and cooking procedures disclosed in the above-referenced patents is to obtain a coating which has the taste, texture, and appearance associated with fried foods. This effort is undoubtedly a result of the public's seemingly insatiable appetite for fried foods. Lately, however, consumers are becoming increasingly health-conscious, as evidenced by the fact that many consumers are turning to foods which are high in nutritional value and low in cholesterol, saturated fat, and caloric content. Consumers have also shown concern regarding the use of preservatives to enhance the shelf life of certain products. The trend toward healthier foods is likely a reaction to recent medical findings which show that a high intake of fat and cholesterol may lead to arterial and heart disease. The public's reaction to these findings has placed an increased emphasis on the ingredients and processing techniques used to create coated foods.

It is therefore desirable to provide a food coating which provides satisfying taste, nutrition, texture and appearance, which is low in cholesterol, saturated fat, and caloric content, and which also provides a long shelf life with little or no preservatives. The present invention provides such a food coating and the method for manufacturing same.

OBJECTS OF THE INVENTION

Accordingly, it is a main object of the present invention to provide a food coating which is made from aromatic rice.

It is also an object of the present invention to provide a food coating which has a unique and satisfying aroma and taste, unlike any other food coating known in the prior art.

Still another object of the present invention is to provide a food coating that does not conglomerate and lose its crispiness when exposed to moisture.

Another object of the present invention is to provide a food coating which is high in nutrition.

It is a further object of the present invention to provide a food coating which is low in caloric content and has no cholesterol and saturated fat.

It is still a further object of the present invention to provide a food coating which provides a long shelf life with little or no preservatives.

Yet another object of the present invention is to provide a food coating which is hypoallergenic.

A further object of the present invention is to provide a food coating which is free of oil and gluten.

Still a further object of the present invention is to provide a food coating which entails easy preparation and clean-up for the consumer.

It is also an object of the present invention to provide a food coating which easily distributes uniformly on the surface of food.

It is a further object of the present invention to provide a food coating which adheres to the surface of the food as opposed to the person preparing the food.

Other and further objects, features and advantages of the present invention will be readily apparent to those skilled in the art after reading the following description of the preferred embodiments.

SUMMARY OF THE INVENTION

Briefly stated, the features of the present invention are accomplished by coating a moistened food product with a unique, dry rice particle composition and then cooking the coated food product. The rice particle composition is manufactured from so-called fragrant or scented rices, which are also known as "aromatic rices," and which derive their distinct aroma and flavor primarily from a potent aroma component, 2-acetyl-1-pyrroline. Aromatic rices, when processed according to the methods of the present invention, yield a dry rice particle composition which not only has a unique aroma and flavor, but also has an unexpected texture which enables the rice particle composition to easily distribute uniformly on the surface of food, to adhere to the surface of the food as opposed to the person preparing the food, and to maintain its crispiness when exposed to moisture.

To produce the food coating composition of the present invention, a fragrant rice having a 2-acetyl-1-pyrroline concentration of at least 40 ppb by weight is ground to a predetermined particle size by any means common in the art. Generally, the rice particles must be of a particle size wherein at least a majority of the particles are retained on a 120 mesh U.S. Standard Screen after passing through a 20 mesh U.S. Standard Screen. Once the desired rice particle sizes are obtained, other ingredients, such as shortening, milk solids, minor amounts of other flours (e.g., rice, barley, soy, etc.), whey solids, etc., may be mixed with the rice particles. Seasonings such as salt, dextrin, pepper, garlic, paprika, sugar, onion, powder, monosodium glutamate, etc., may also be added.

The resulting food coating composition is useful in that provides a non-oily, moisture resistant mixture which uniformly adheres to the food product, and not to the person preparing the food. Moreover, unlike any other food coating in the prior art, the resulting food coating composition provides a new and distinct aroma and taste which is derived from the 2-acetyl-1-pyrroline. The food coating composition is also hypoallergenic and more nutritious than prior art food coatings as a result of the low caloric content and lack of chloresterol, saturated fat, oil, and gluten. Until the present invention, those skilled in the art have not expected a rice product to provide a coating mix with the aforementioned characteristics. Thus, the present invention provides a food coating composition which is new, unexpected and useful.

DESCRIPTION OF THE INVENTION

The Preferred Embodiment

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof) falling within the scope of the appended claims.

The food coating composition of the present invention is manufactured from so-called fragrant or scented rices, which are also known as "aromatic rices." Fragrant rices are an important commodity worldwide and command a premium price over non-fragrant varieties of rices in some areas, particularly in Southeast Asia, India, and some middle east countries. In the United States, fragrant rices are gaining popularity and are available in certain shops that specialize in grains and foreign foods, but American consumers still prefer the more bland varieties such as the Texas Long Grain rice or Calrose rice.

Fragrant rices are known by different names according to the geographical area in which they are grown. A non-exclusive list of such rices includes Basmati rice from Pakistan and India; Jasmine and Khao Dawk Mali rices from Thailand; Malagkit Sungsong and Milagraso rices from the Philippines; Seratus Malam rice from Indonesia; and Hieri rice from Japan. Another variety of fragrant rice is Della rice, which is also known as Dellmont Quality or Dellrose rice.

All of these fragrant rices have their own unique characteristics. For instance, Basmati rice has the kernel dimensions of a long grain rice. It has a moderately firm cooked texture, is dry and not sticky after cooking and has an aroma often described as being popcorn like. It has an amylose and gelatinization temperature similar to conventional U.S. long grain rice. Although Basmati rice originated in India and Pakistan, rices that have these same unique quality traits are also currently grown in the U.S. Jasmine rice has long grains that when cooked are soft and cling to each other. Jasmine rice also possesses a distinctive aroma often reported to be popcorn-like. Della, Dellmont quality, are Dellrose rice is a long grain aromatic rice whose aroma is also said to be popcorn like. Although the aroma is similar to Jasmine and Basmati-style rice, its texture mimics that of conventional U.S. long grain rice.

Fragrant rices derive their distinct aroma and flavor primarily from a potent aroma component, 2-acetyl-1-pyrroline, which provides the "popcorn-like" or "nutty" aroma and flavor to the rice. 2-acetyl-1-pyrroline was first identified as an aroma component of rice in or about 1982. 2-acetyl-1-pyrroline exists in flagrant rices at concentrations of at least 40 ppb by weight, which is about ten times that of the American Calrose and Texas Long Grain varieties.

To produce the food coating composition of the present invention, a fragrant rice having a 2-acetyl-1-pyrroline concentration of at least 40 ppb by weight is ground to a predetermined particle size by any means common in the art. The particle size is critical in that substantial amounts of larger particles tend to impart a gritty, non-uniform, and particulate coating, as opposed to the preferred hard, thin, and crisp coating. Also, excessive amounts of very fine particles usually result in a non-uniform coating and a floury taste and texture. Generally, the rice particles must be of a particle size wherein at least a majority of the particles by weight are retained on a 120 mesh U.S. Standard Screen after passing through a 20 mesh U.S. Standard Screen.

The grinding temperature of the rice particles is not as critical as the particle size. However, the grinding temperature of the rice particles is preferably maintained between 19° F. and 121° F. to ensure that the rice particles have an acceptable moisture content, as recognized by those skilled in the art. The moisture content of the food coating composition contributes to the lengthy shelf life of the final product.

Once the desired rice particle sizes are obtained, the rice particles are mixed at a temperature which is preferably in the range of 20° F. and 110° F. Other ingredients, such as shortening, milk solids, minor amounts of other flours (e.g., rice, barley, soy, etc.), whey solids, etc., may be added to the food coating composition at this point. Seasonings such as salt, dextrin, pepper, garlic, paprika, sugar, onion powder, monosodium glutamate, etc., may also be added at levels effective for the desired flavor. In addition, the food coating composition may contain other ingredients, such as processing aids, preservatives, and coloring, but these ingredients are not necessary to achieve the desired appearance, flavor, and texture.

Appropriate food products to use with the food coating composition of the present invention include such categories as meat, fish, poultry and vegetables. For example, chicken pieces, chicken cutlets, pork chops, fish fillets or vegetable strips are all suitable.

To coat the food product with the food coating composition of the present invention, the food product must be moistened, i.e., the surface of the food product must be moist, damp or slightly wet. This can be commonly carried out by spraying the food product with water or dipping the food product in water. The food product can also be moistened using a batter. Some examples of suitable batters are egg, egg and water, egg and milk, flour, egg and milk, flour and water, flour and egg, flour dusting then water, flour and milk, starch and water, starch and milk, gum and water, gum and milk, barbecue sauce, etc. The food product can be coated with batter by dipping, spraying, and/or immersing etc. the food product. Preferably, the food product is first flour dusted prior to batter coating as this results in a more continuous adherent coating.

The moistened food product can then be coated with the food coating composition by any means common in the art, such as applying the composition to the moistened food product in a closed bag containing the food coating composition or completely covering the moistened food product with the composition and then pressing the composition firmly onto the moistened food product. When the dry food coating composition comes into contact with the moistened surface of the food product, the food coating composition adheres to the food product surface, as opposed to the food preparer, and unexpectedly maintains its crispiness and does not conglomerate. These characteristics, in particular, make the product of the present invention easy to use.

After the food coating composition is coated onto the moistened food product, the coated food product is then cooked in a conventional manner, such as by roasting, baking, broiling or frying. Preferably, the coated food product is baked on a surface coated with a minimal amount of oil, that is, at least a sufficient amount of oil to cover the surface. This is done not only to prevent sticking of the food product to the surface, but to enhance the development of a fried taste, texture and appearance in the resultant baked food product.

Upon coating and cooking a food product coated with the food coating composition of the present invention, excellent and uniform adherence of the rice particles to the food product is observed as well as a coating with improved crispness. This uniform adherence is observed even when the food product is irregularly shaped (e.g., chicken pieces), or even when the food product is exposed to moisture, thus overcoming difficulties which have been common in the art.

Moreover, the coated and cooked food product has a unique and distinct aroma and taste which is derived from the 2-acetyl-1-pyrroline contained in the fragrant rice coating, unlike any food coating in the prior art. The coated and cooked food product is also more nutritious as a result of the low caloric content and lack of chloresterol, saturated fat, oil, and gluten in the food coating composition of the present invention.

While the above description contains many specificities, these should not be construed as limitations on the scope of the invention, but rather as an exemplification of one preferred embodiment thereof. Many other variations are possible. Accordingly, the scope of the present invention should be determined not by the embodiment(s) illustrated, but by the appended claims and their legal equivalents.

What is claimed is:

1. A process for preparing a proteinaceous food comprising the steps of:

(a) moistening a proteinaceous food;

(b) coating the moistened proteinaceous food with a dry mix composition, said composition comprising a fragrant rice which is ground into particles at a temperature between 19° F. and below 121° F., and then mixed at a temperature between 19° F. and below 111° F., said particles having a particle size which is retained on a 120 mesh U.S. Standard Screen after passing through a 20 mesh U.S. Standard Screen; and (c) cooking said proteinaceous food.

2. The process of claim 1 wherein said dry mix composition further comprises a seasoning.

3. The process of claim 2 wherein said fragrant rice has a concentration of 2-acetyl-1-pyrroline of at least 40 parts (weight) of 2-acetyl-1-pyrroline per billion parts of rice (dry weight).

4. The process of claim 3 wherein said fragrant rice is Basmati rice.

5. The process of claim 3 wherein said fragrant rice is Jasmine rice.

6. The process of claim 3 wherein said fragrant rice is Della rice.

* * * * *